Feb. 2, 1937.  F. W. STORCK  2,069,729
MOTOR DRIVE CONTROL FOR DUPLICATING MACHINES AND THE LIKE
Filed Feb. 7, 1935

Inventor.
Frederick W. Storck.
By Ernest R. Llewellyn.
Attorney.

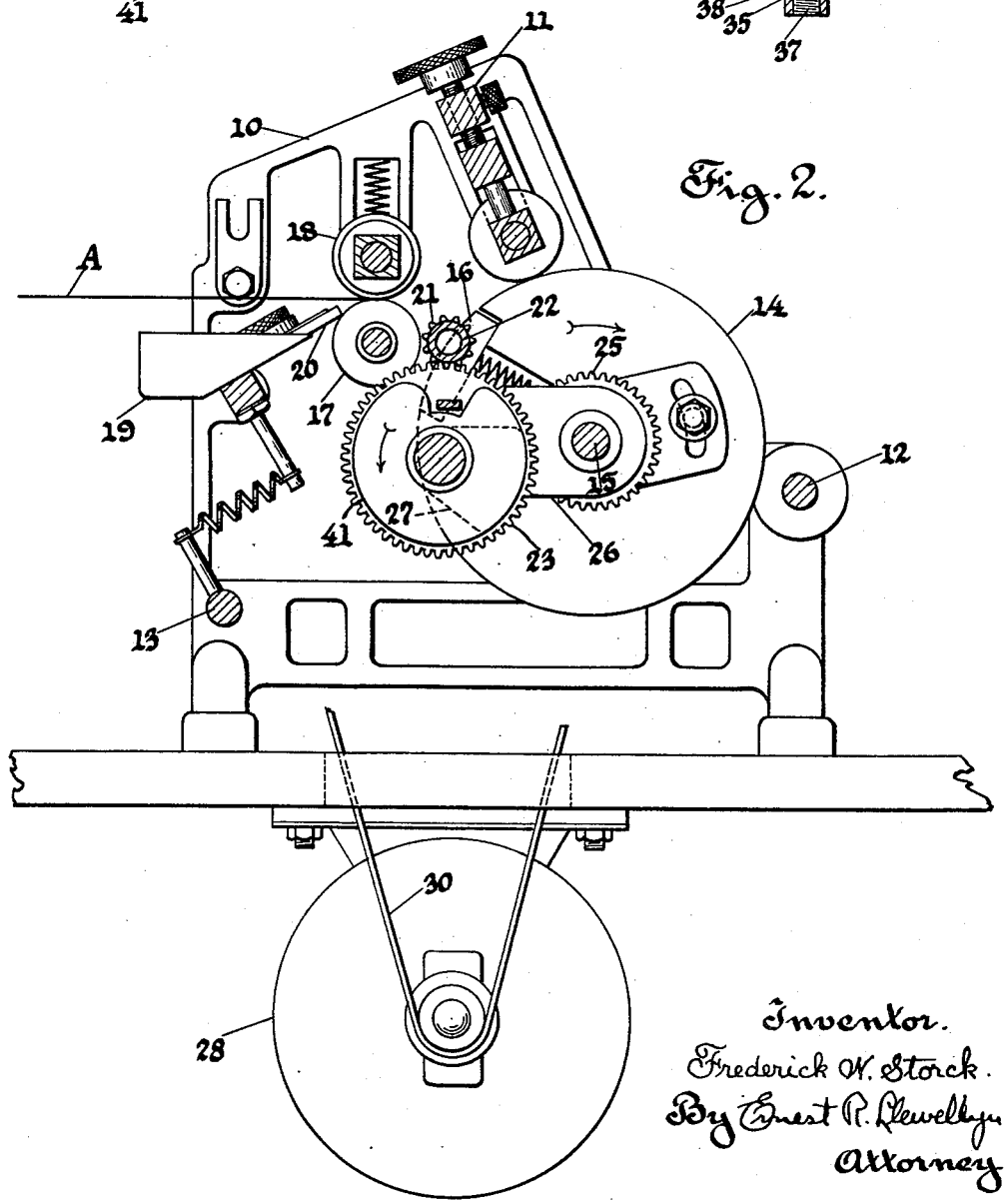

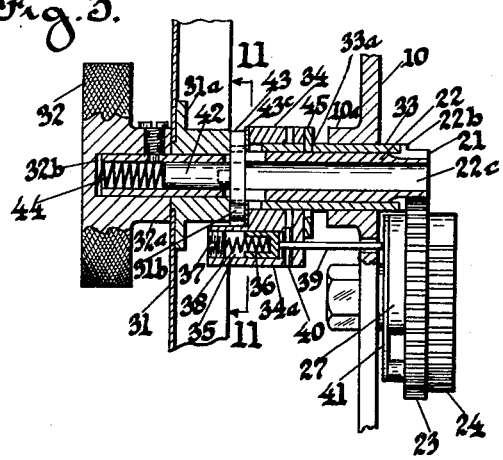
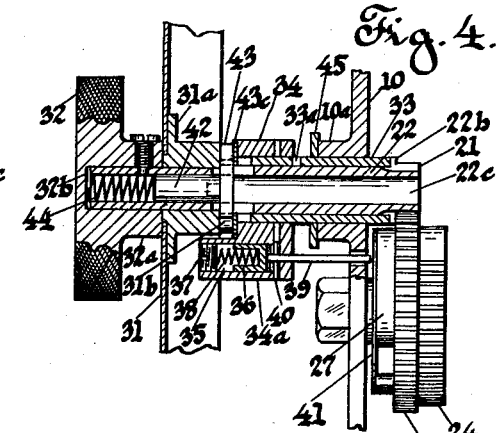
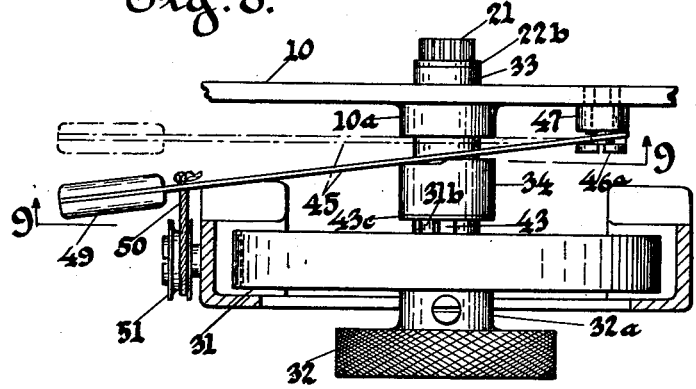
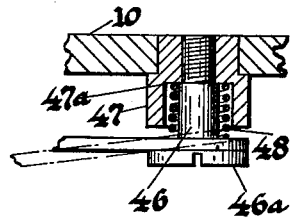
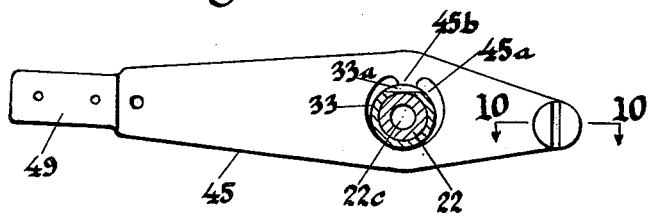
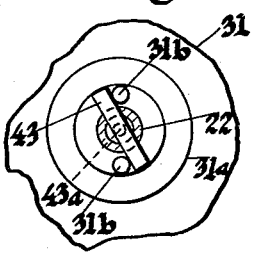

Patented Feb. 2, 1937

2,069,729

UNITED STATES PATENT OFFICE 2,069,729

MOTOR DRIVE CONTROL FOR DUPLICATING MACHINES AND THE LIKE

Frederick W. Storck, Arlington, Mass., assignor to Standard Mailing Machines Company, Everett, Mass., a corporation of Massachusetts Application February 7, 1935, Serial No. 5,426

15 Claims. (Cl. 101—132)

This invention relates to duplicating machines and more particularly to an optionally selective drive for actuating the machine for a single cycle or in continuous successive cycles of operation of the machine.

In general, in duplicating machines of the herein referred to character, it is the practice to secure a master copy to a printing platen or drum. The clear sheets, upon which the master copy is to be duplicated are singularly positioned for feeding into engagement with the master copy and during the feeding function the clear sheet is moistened by various methods known in the art. After the clear sheet is positioned for engagement and registration with the master copy, the machine is actuated to engage the master copy and clear sheet in a contacting and duplicating relation as is well known. After this duplicating function has been completed the master copy must be again definitely positioned relative to the feeding of the next successive clear sheet. To obtain a proper registration of the clear sheet with the master copy, it is obvious that the feed and master copy device actuating mechanism must be correlated. Feed rolls, functioning in a direct relation to the master copy device, are invariably utilized for the feeding of the clear sheets into registration with the master copy.

To permit the proper positioning of a clear sheet between the feed rolls it is obviously desirable that the feed rolls remain inactive for a sufficient increment of time and in a definite fixed relation to the master copy device. After the clear sheet has been positioned, between the feed rolls, the operating mechanism is then rotated, thus causing the clear sheet to be advanced by the feed rolls into engagement and registration with the then rotating master copy device.

To obtain the required inactive period of the elements to permit positioning of the clear sheet for feeding and registration is a comparatively simple problem when a device is utilized, wherein one complete revolution is made and the device remains at rest until it is again started by the operator and thus permitting any desired increment of dwell period within which a sheet may be properly positioned for feeding and registration. Devices for obtaining this result are well known and exemplified in the so-called hand operated machine wherein a crank handle, or similar device, is utilized for actuating the mechanism for a complete cycle of operation and the crank handle is stopped after each complete cycle by means of a latch, stop pin, notch or similar indicating device which must be released or disengaged for each subsequent cycle of operation.

It has been the general practice in constructing driving connections for duplicators to utilize continuous gearing elements or sprockets with continuous chain connections with indicating devices, as above mentioned, to control the starting and stopping of the cycle of operation.

It is recognized that this single cycle phase of operation is particularly advantageous to a beginner learning to operate the machine as it permits an indefinite dwell period in which to properly position the sheets for feeding engagement.

It is obvious that continued hand operation of the duplicating machine over an extended period of time or continuous operation is fatiguing and particularly so when an attempt is made to obtain capacity production from the machine. Therefore, it is desirable to utilize motive power to actuate the duplicating machine mechanism in an intermittent manner and which, as desired, may be actuated for a single cycle of operation with an indeterminate dwell period between each cycle or actuated in continuous successive cycles with a predetermined dwell period between each successive cycle.

To retain the above renumerated advantages in the operation of the so-called hand machine when utilizing motive power, presents many problems in reducing the required mechanism to its simplest and most compact form with a minimum requirement in controlling and operating the machine.

Also, in duplicating machines of the above referred to character, it is essential, when utilizing motive power, to provide means for manually rotating the master copy device for the purpose of attaching and removing the master copy. It is desirable in manually rotating the master copy device to do so irrespective of whether or not the motor is energized.

Machines of the above duplicator character are invariably operated by persons inexperienced in mechanisms and who are liable to become confused in the operation of a device wherein a series of controls or adjusting points are utilized in the operating mechanism, as, for example, in shifting from one phase of operation to another, or in making necessary changes or adjustments of the master copy on the duplicator.

Accordingly, one of the objects in my present invention is to provide a motor drive and control of duplicators to eliminate the fatigue now occasioned by the hand operation of such machines.

Another object of my invention is to provide a positive drive for intermittently actuating the printing platen in a positive synchronized relation with coacting feed rolls for a complete cycle of operation from a definite point and to interrupt continued actuation of the printing platen at this definite point for an increment of time during which a clear sheet may be fed into an engaging position with the feed rollers for proper registration and engagement with the printing platen upon continued actuation of the platen.

A further object of my invention is to provide a motor drive control and wherein the printing platen may be manually actuated independent of and irrespective of the motor.

A still further object of my invention is to provide a motor drive control for duplicators wherein, through a single operating control, a novel, simplified and compact means may be engaged in driving relation with the motor and driving connections of the machine for a single complete cycle of operation, or by means of this same single control, the engaging means may be positioned to cause the machine to be automatically operated in continuous intermittent cycles.

And further, my invention has for an objective the provision of a novel mechanism whereby the motor drive is automatically disconnected from its driving relation at a predetermined point and in a direct relation to the printing platen of the machine.

With the above and other objects in view, my invention comprises a novel combination and arrangement of parts hereinafter described and more specifically pointed out in the appended claims.

In the accompanying drawings I have shown my invention embodied with a duplicating machine, as shown and described in my United States Letters Patent No. 1,964,933, issued July 3, 1934, sufficient to enable those skilled in the art to understand the construction and operation thereof. It is to be understood that the embodiment of my motor drive control with the particular duplicating machine shown is for illustrative purposes only, and my motor drive control is not to be construed as being limited thereto.

Referring to the drawings:—

Fig. 2 is a vertical sectional view taken substantially along line 2—2, Fig. 1.

Fig. 3 is a view corresponding substantially to the sectional portion of Fig. 1, but shows my clutch in its engaging position.

Fig. 4 corresponds substantially to Fig. 3, but shows the clutch released for disengagement.

Figure 1:
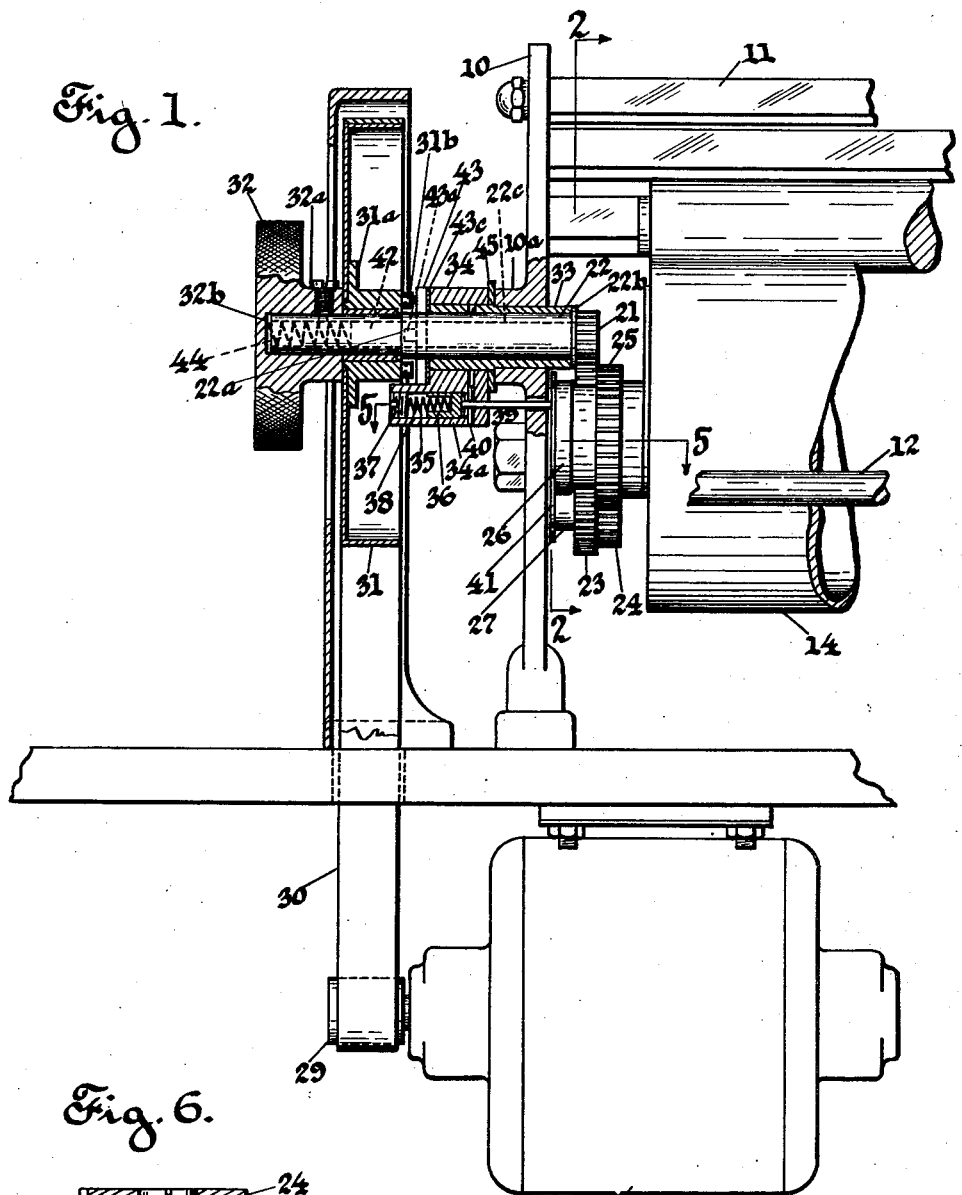
Fig. 1 is a partial end view of a duplicating machine having my motor drive and control embodied therewith, in this view a portion of the drive control is shown in section.

Fig. 5 is a horizontal section taken substantially along line 5—5, Fig. 1.

Figure 6:
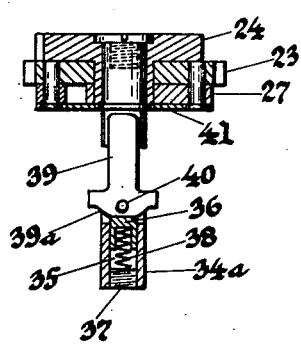

Fig. 6 is a view corresponding to Fig. 5, but shows the yielding clutch control lever positioned corresponding to Figs. 3 and 4.

Fig. 7 is a detail of my clutch control disc.

Fig. 8 is a plan view of my drive control as illustrated at Fig. 1 but shows the clutch in its engaging position.

Fig. 9 is a section taken substantially along line 9—9, Fig. 8.

Fig. 10 is a section of my operating lever pivot and taken along line 10—10, Fig. 9.

Fig. 11 is a sectional view taken substantially along line 11—11, Fig. 3.

The duplicating machine

The duplicating machine illustrated comprises opposed stationary side frames 10, in which are mounted the operating elements of the duplicator. The frames 10 are retained in spaced relation by transverse tie rods 11, 12 and 13.

The printing platen 14 is rotatably mounted upon a stationary shaft 15 suitably supported in the side frames 10. The printing platen 14 is provided with a clamping device 16 for holding a master copy.

When feeding a clear sheet of paper A to the duplicator, it is moved forward from a support, not shown, until the forward edge of said sheet evenly contacts with the feeding rolls 17, 18, see Fig. 2. The lower feed roll 17 is geared directly to the platen 14 and driven in a direct relation thereto. This feeding of the clear sheet into contact with the feed rolls 17, 18 is accomplished during the dwell period of the machine and while the feed rolls 17, 18 are at rest.

In this particular instance, a suitable moistening fluid is applied preferably to the under side of the clear sheet by the roll 17, as the sheet is fed through the feeding rolls 17, 18. This moistening fluid is fed from a reservoir 19, by means of capillary action of a fibrous material 20, to the moistening and feed roll 17.

The mechanism for intermittently rotating the printing platen 14 consists of a driving pinion 21 formed, in this instance, integrally with a tubular drive shaft 22 which is rotatably mounted in a suitable bearing 10a of the frame 10.

The driving pinion 21 meshes with and drives an intermediate gear 23, to which the intermittent gear 24 is secured. The intermittent gear 24 meshes with a coacting intermittent gear 25 which is adjustably secured to the printing platen 14. These intermittent gears 24, 25 are of the usual construction, wherein a predetermined portion of the periphery of each is free from teeth and continued rotation of the driving gear will not rotate the driven gear until the blank space in the driving gear has passed the blank space in the driven gear and the teeth of both engage.

The gears 23, 24 are adapted to be continuously rotated and are preferably proportioned relative to the gear 25 so that the gears 23, 24 will make approximately one and one-fourth revolutions to one revolution of the gear 25 secured to the drum. These proportions may be varied as desired to obtain a greater or lesser increment of dwell period for the printing platen for the purpose of feeding the clear sheets as above described.

In this particular instance I have provided coacting lock slides 26, 27, which are associated with the opposed intermittent gears 24, 25. These lock slides 26, 27 function in a manner corresponding to the usual blank spaces of the opposed intermittent gears. This construction is well known and utilized in instances wherein the blank space of one of the intermittent gears would only permit of a very limited slide length which would have a tendency to produce a wedging action between the opposed slides.

A duplicating machine of substantially the above construction is fully shown and described in my above referred to patent, therefore further detailed description is thought unnecessary and more particularly in view of the fact that my motor drive is not specifically limited thereto.

The motor drive and control

The motor 28 is preferably mounted on the under side of a table top on which the duplicating machine is positioned. The motor pulley 29 is connected by means of a belt 30, or other suitable connection, with the primary machine drive pulley 31 which has its hub 31a freely mounted on the pinion shaft 22. The inner end face of the pulley hub 31a abuts against a shoulder 22a of the shaft 22, the opposed end of said hub 31a engaging the inner face of the hub 32a of a knurled hand wheel 32 which is secured to the pinion shaft 22.

The frame hub 10a is provided with a bushing 33, the inner end of which abuts against a collar 22b formed integrally with the pinion shaft 22. The opposed end of said bushing 33 extends beyond the outer face of the hub 10a and has slidably mounted thereon the hub 34 of my clutch releasing device. The lower portion 34a of the hub is provided with a longitudinal bore 35 in which is slidably mounted a plunger 36. The open end of the bore 35 is closed by means of a screw plug 37 which acts as a bearing for one end of a compression spring 38 positioned within the bore 35. The opposed end of said spring 38 has its bearing against the plunger 36 and normally urges the plunger into contact with the flat portion of the cam end 39a of an indicator lever 39 which is pivoted at 40 to the lower portion 34a of the hub. The inner end of the indicator lever 39 is adapted to contact and engage with a coacting control disc 41 which, in this instance, is secured to the gear cluster comprising gears 23, 24 and the lock slide 27.

Slidably mounted within the bore 22c of the pinion shaft is a plunger 42 which is adapted to engage the pilot pin 43a of the clutch key 43 extending transversely of said shaft 22 and projecting therefrom through suitable longitudinal slots formed in the shaft. A compression spring 44 is also mounted within the bore 22c of the pinion shaft 22, said spring having one end bearing against the plunger 42 and its opposite end bearing against the end of the hand wheel bore 32b. The spring 44 normally urges, through the plunger 42, the clutch key 43 into contact with a friction washer 43c which is interposed between the clutch key 43 and the outer face of the clutch releasing device hub 34.

In this instance my operating lever 45 is positioned between the inner face of my clutch releasing device hub 34 and the outer face of the frame hub 10a. The intermediate portion of the operating lever is provided with an enlarged opening 45a adapted to encircle the bushing 33. This opening 45a is provided with an inwardly extending projection 45b adapted to engage in a transverse angularly disposed recess 33a in the bushing. The lever 45 pivotally engages a stud 46 threadedly engaged in a bushing 47 secured in the frame 10. The stud 46 is provided with an enlarged head 46a which is spaced apart from the outer face of the bushing 47. A compression spring 48 encircles the stud 47 and has its bearing at one end against the end of the enlarged bore 47a in the bushing 47. The opposed end of said spring 48 has its bearing against the inner side face of the control lever 45 and normally urges the lever into contact with the under face of the stud head 46a, see Figs. 8 and 10, and against the outer face of the frame hub 10a. The opposed end of the operating lever 45 is provided with a suitable handle 49 by which the lever may be operated by hand, also, I have provided a cable or chain 50 which is attached to the operating lever 45 and extends over an idler pulley 51 downwardly to a foot treadle (not shown) by which the operator may actuate the lever.

Control of a single cycle of operation

The motor 12 is continuously rotated and, through the motor pulley 29 and belt 30 the primary machine drive pulley 31 is continuously and freely rotated upon the pinion shaft 22. When a single operating cycle of the machine is desired, the operating lever 45 is moved outwardly from the machine frame 10, see Fig. 8, thus causing the clutch key 43 to be moved into engagement with the driving pins 31b, projecting from the pulley hub 31a, and rotated therewith, this, in turn, rotates the shaft 22 and pinion 21 which is in engagement with the intermittent gear cluster.

As the lever 45 is moved to its engaging position the releasing device hub 34 is moved outwardly, causing the indicating lever 39 to be withdrawn from the engaging path of the disc 41, see Fig. 6.

When the clutch is engaged, and the lever 45 released by the operator, the compression spring 44 and plunger urge the clutch key 43 to the right in its disengaging direction. Disengagement of the clutch key 43 is prevented due to the end of the indicating lever 39 being forced, through the action of the spring 44, into contact with the face plane of the control disc 41, see Fig. 7, and, through the hub 34, retains said clutch key in engagement with the driving pins 31b. The disc 41 is rotated in the direction of the arrow, Figs. 2 and 7, until the opening 41a registers with the lever end, thus permitting the spring 44 to force the clutch key 43 and control unit hub 34 to the right, the lever 39 entering into the opening 41a of the disc, see Fig. 5. This disengages the clutch key 43 from driving relation with the pins 31b. It is obvious that various means may be employed for controlling the movement of my indicating lever such as, for example, forming a recess directly in one of the gears and which would coact with the lever in the manner of the control disc which I have described.

From the foregoing it is obvious that disengagement of my clutch can only be effected at a predetermined point in the cycle of operation, this point being determined by the positioning of an opening or other device to coact with the indicating lever 39.

Continuity in operating cycles

When it is desired to operate the machine in continuous successive cycles of operation, the operating lever 45 is moved in an outward direction, Fig. 8, as above described, and, as the clutch elements are positioned in their engaging path, the lever is moved downwardly to engage the projection 45b of the lever in the recess 33a. This, as is obvious, locks the clutch elements in engagement and restrains the indicating lever 39 from contact with the control disc 41. As the lever is released from engagement with the slot 33a the spring 48 will move said lever to its normal inoperative position as shown by broken lines Fig. 8. The clutch elements are retained in engagement, as previously described, until the indicating lever 39 again registers with the opening 41a and permits the spring 44 to move the elements to their normal inoperative position.

Manual operation

It is to be observed that when my clutch is disengaged and the machine is in its normal inoperative position, the motor and drive pulleys may be continuously operated and, through the hand wheel 32, or other suitable means, such as a crank secured to or engaged with the pinion shaft, the gear train may be manually rotated in converse directions and independent of the clutch elements. This feature has many advantages in duplicating machines or machines of a like character wherein it is desirous to make manual adjustments or attachment of matter to be utilized as will be readily appreciated.

It is obvious that when the clutch elements are in their normal disengaged position, the indicating lever 39 will project through the opening 41a and into the engaging path of the disc, see Fig. 5. Normal aligned movement to disengage this lever 39 from the path of the disc 41 would cause engagement of the clutch elements. Therefore I have provided an indicating lever 39 of a yielding structure and wherein, through the spring 38 and plunger 36, the lever is retained in axial alignment with the pinion shaft 22. As the disc 41 is rotated in either direction the edge face of the opening 41a will engage the lever 39 and swing it about its pivot as shown by broken lines, Fig. 5. When the lever 39 has been moved to its extreme angular position, in either direction, by the edge face of the opening 41a, the lever will thereafter engage the face of said disc until continued rotation of the disc permits the spring 38, through the action of the plunger 36 being urged into engagement with the flat portion of the cam end of the lever 39, to force said lever into its normal aligned position upon registration of the disc opening 41a.

From the foregoing, it is obvious that I have provided a simple and efficient motor drive control which is compact in form and embodying many desirable features in its method of operation.

Having thus described my invention, it is obvious that many changes and modifications may be made therein by those skilled in the art, therefore I do not wish to be limited to the specific details herein disclosed, but what I claim is:—

1. A duplicating machine having a master printing platen adapted for continued rotation with a dwell period in its cycle of rotation, a gear train for actuating said platen, a drive shaft directly connected to a member of said gear train, a freely rotatable member mounted on said shaft and adapted for continuous rotation, clutch elements slidably supported by said shaft, means to actuate said clutch elements to engage said shaft and said second member in driving relation, means urging said clutch elements to their normal disengaged position and operable upon release of and independent of said first means.

2. A duplicating machine having a master printing platen, driving connections for intermittently actuating said platen, a drive shaft directly connected to a member of said driving connections, a freely rotatable member mounted on said shaft and adapted for continuous rotation, clutch elements slidably supported by said shaft, means to actuate said clutch elements to engage and retain said shaft and said second member in driving relation, means, carried by said drive shaft, urging said clutch elements to their normal disengaged position and operable, upon release of and independent of said first means, to disengage said clutch elements in a direct relation to the intermittent period of said driving connection.

3. A combination as in claim 2 in which the means to actuate the clutch elements engages the shaft and rotatable member for a single cycle of operation and wherein the clutch elements are retained in their engaged position independent of the clutch engaging means.

4. A duplicating machine having a rotatable drum, driving conections for intermittently actuating said drum, a drive shaft directly connected to a member of said driving connections, a freely rotatable member mounted on said shaft and adapted for continuous rotation, clutch elements slidably supported by said shaft, means to actuate said clutch elements into engaging position with spring pressed means, independent of said last means, to automatically disengage said clutch elements in a positioned relation to said rotatable drum.

5. A combination as recited in claim 4 in which means are provided whereby the drive shaft may be manually operated independent of the clutch elements.

6. A duplicating machine having a rotatable drum, driving connections for intermittently actuating said drum, a drive shaft directly connected to a member of said driving connections, a freely rotatable member mounted on said shaft and adapted for continuous rotation, clutch elements slidably supported by said shaft, optional single or multi-cycle clutch engaging and retaining means, spring pressed disengaging means, indicating means associated with said spring pressed means and said driving connections whereby said clutch is disengaged in a positioned relation to said drum.

7. A driving member and a driven member, driving connections between said members said connections embodying a tubular drive shaft directly connected to one of said connections, a freely rotatable member mounted on said shaft and adapted for continuous rotation, a compressible member slidably mounted within said shaft, a transverse longitudinally moveable member in engagement with said compressible member and moveable therewith, means to actuate said transverse member to engage said freely rotatable member in a driving relation with said shaft, said compressible member being adapted to disengage said transverse member upon the release of said last means.

8. A driving member and a driven member, driving connections between said members said connections embodying a tubular drive shaft directly connected to one of said connections, a freely rotatable member mounted on said shaft and adapted for continuous rotation, a compressible member slidably mounted within said shaft, a transverse longitudinally moveable member in engagement with said compressible member and moveable therewith, means to actuate said transverse member to engage said freely rotatable member in a continued driving relation with means for releasing said clutch for disengagement by said compressible member.

9. A drive for a rotary printing member comprising a gear train embodying intermittent driving gears adapted for rotating said printing member in cycles of rotation with a determinate dwell period in each cycle, said dwell period being positively positioned relative to the cycle of rotation, a primary drive member freely rotatable relative to said gear train a spring-pressed clutch element disposed between said primary drive and said gear train, said spring-pressed element being adapted to effect a driving relation between said primary member and said gear train, a manually operated lever adapted to engage and actuate said element to its operative position, said lever being urged, upon manual release, to its normal inoperative position with means cooperating with said spring-pressed element and independent of said lever for restraining disengagement of the driving relation of said spring-pressed member and permitting said element to automatically disengage from its driving relation only in registration with the dwell period of said driving member.

10. A duplicating machine having a rotatable drum, driving connections for intermittently actuating said drum, a drive shaft directly connected to a member of said driving connections, a freely rotatable member mounted on said shaft and adapted for continuous rotation, clutch elements slidably supported by said shaft, determinative cycle clutch engaging and retaining means together with automatic spring-pressed disengaging means for said clutch, indicating means associated with said disengaging means and said driving connections whereby said clutch is disengaged in a positioned relation to the rotative movement of said drum.

11. A drive for a rotary printing member comprising a gear train which embodies intermittent driving gears adapted for rotating said printing member in cycles of rotation with a determinate dwell period in each cycle of rotation, said dwell period being positively positioned relative to the cycle of rotation, a primary drive member normally free to rotate relative to said gear train, a spring-pressed clutch element disposed between said primary drive and said gear train, said spring-pressed element being adapted to effect a driving relation between said primary member and said gear train with manual means for positioning said clutch in its driving relation and against the spring pressure, a disc element rotatable with and in a direct relation to said intermittent driving connections, an aperture in said disc, an indicating lever associated with said clutch element, said lever being adapted to engage with the face of said disc and retain said clutch element in its engaged position until said lever registers with said disc aperture and thus permits said spring-pressed clutch to automatically disengage from its driving relation.

12. A combination as in claim 10 having a pivoted indicating means embodying a lever yieldingly retained in operative position and adapted for movement ineffective upon said clutch when said clutch is disengaged with means for urging said lever to its normal functional position.

13. A driving member and a driven member, a clutch member disposed between said driving and driven members with means for engaging said clutch in driving relation with said first members, compressible means for urging said clutch to its inoperative position, clutch restraining and releasing means associated with said clutch and driven member, said means embodying an element rotated relative to said driven member, an aperture in said element and in a registered relation to said driven member, a lever associated with said clutch and adapted to cooperate with said rotated element in retaining said clutch in its operative position during the rotative movement of the drive elements and until said lever registers with said aperture and permits the compressed means to actuate said clutch to its inoperative position.

14. The combination as in claim 13 having a pivoted lever associated with said clutch and yieldingly retained in operative position and adapted for movement ineffectual upon the disengaged position of said clutch with resilient means for urging said lever to its normal functional position.

15. A drive for a rotary printing member comprising a gear train which embodies intermittent driving gears adapted for rotating said printing member in cycles of rotation with a determinate dwell period in each cycle of rotation, said dwell period being positively positioned relative to the cycle of rotation, a primary drive member freely rotatable relative to said gear train, means including a manually operated drive control lever for effecting operative engagement of said gear train, and said primary drive member, said lever being urged, upon manual release, to its normal inoperative position with means independent of said lever for restraining disengagement of said driving relation together with spring-pressed means cooperating with said first means for automatically disengaging the driving relation of the drive elements in registration with the dwell period of said printing member.

FREDERICK W. STORCK.